(12) United States Patent
Pula et al.

(10) Patent No.: US 8,888,037 B2
(45) Date of Patent: Nov. 18, 2014

(54) ANTIVIBRATION SUSPENSION MEANS FOR A TIE BAR OF AN AIRCRAFT POWER TRANSMISSION GEARBOX, AN ANTIVIBRATION SUSPENSION DEVICE, AND AN AIRCRAFT

(71) Applicant: Airbus Helicopters, Marignane, Cedex (FR)

(72) Inventors: Mathieu Pula, Aix en Provence (FR); Thibault Galat-Camerini, Cornillon-Confoux (FR)

(73) Assignee: Airbus Helicopters, Marignane Cedex (FR)

( * ) Notice: Subject to any disclaimer, the term of this patent is extended or adjusted under 35 U.S.C. 154(b) by 86 days.

(21) Appl. No.: 13/671,637

(22) Filed: Nov. 8, 2012

(65) Prior Publication Data
US 2013/0119192 A1     May 16, 2013

(30) Foreign Application Priority Data
Nov. 15, 2011 (FR) ..................... 11 03468

(51) Int. Cl.
*B64C 27/00* (2006.01)
*F16F 7/10* (2006.01)
*B64D 27/26* (2006.01)

(52) U.S. Cl.
CPC .............. *B64D 27/26* (2013.01); *F16F 7/1011* (2013.01); *B64C 2027/002* (2013.01); *B64C 27/001* (2013.01)
USPC .......................... 244/17.27; 188/379; 188/380

(58) Field of Classification Search
USPC .............. 244/17.27, 54, 17.13; 188/379, 380, 188/378; 248/638
See application file for complete search history.

(56) References Cited

U.S. PATENT DOCUMENTS

| | | | |
|---|---|---|---|
| 3,945,628 A * | 3/1976 | Halwes | 267/152 |
| 4,088,042 A | 5/1978 | Desjardins | |
| 4,431,148 A * | 2/1984 | Mouille | 244/17.27 |
| 4,458,862 A | 7/1984 | Mouille | |
| 5,813,626 A | 9/1998 | Zoppitelli | |
| 6,283,408 B1 * | 9/2001 | Ferullo et al. | 244/17.27 |

(Continued)

FOREIGN PATENT DOCUMENTS

| | | |
|---|---|---|
| FR | 2363737 A1 | 3/1978 |
| FR | 2474996 A1 | 8/1981 |
| FR | 2499505 A1 | 8/1982 |

(Continued)

OTHER PUBLICATIONS

Search Report and Written Opinion; Application No. FR1103468; dated Jun. 26, 2012.

*Primary Examiner* — Christopher P Ellis
(74) *Attorney, Agent, or Firm* — Brooks Kushman P.C.

(57) ABSTRACT

An antivibration suspension device (10) comprising at least one tie bar (15) hinged via a bottom end (17) to suspension means (20), the suspension means (20) having a lever (25) extending from a distal end (26) supporting at least one flyweight (30) to a proximal end (27) having a first hinge (35) to a carrier structure (2), a tie bar (15) being hinged via a second hinge (40) to the lever (25). The device includes torsion return means (45) having a rotary actuator (46) with an outlet shaft (47) secured to said lever (25) to generate torque on said lever (25), said device having a computer (50) controlling said actuator (46) to adapt torsion stiffness of the lever (25) to flight conditions.

19 Claims, 2 Drawing Sheets

(56) References Cited

U.S. PATENT DOCUMENTS 6,325,327 B1 * 12/2001 Zoppitelli et al. ......... 244/17.27
6,776,370 B2 * 8/2004 Struzik et al. ............. 244/17.27
7,118,328 B2 * 10/2006 Welsh et al. ............. 416/170 R
8,215,606 B2 7/2012 Haynes

FOREIGN PATENT DOCUMENTS

| FR | 2747098 A1 | 10/1997 |
| FR | 2787762 A1 | 6/2000 |
| FR | 2795386 A1 | 12/2000 |
| WO | 03100284 A2 | 12/2003 |

* cited by examiner

ANTIVIBRATION SUSPENSION MEANS FOR A TIE BAR OF AN AIRCRAFT POWER TRANSMISSION GEARBOX, AN ANTIVIBRATION SUSPENSION DEVICE, AND AN AIRCRAFT

CROSS REFERENCE TO RELATED APPLICATION

This application claims priority to French patent application No. FR 11 03468 filed on Nov. 15, 2011, the disclosure of which is incorporated in its entirety by reference herein.

BACKGROUND OF THE INVENTION (1) Field of the Invention

The present invention relates to antivibration suspension means for a tie bar of a main power transmission gearbox, to an antivibration suspension device including the suspension means, and to an aircraft having such a device.

The invention is thus situated in the narrow technical field of devices for reducing aircraft vibration.

(2) Description of Related Art

Aircraft include in particular rotorcraft having at least one lift rotor connected to a carrier structure, the carrier structure conventionally being referred to as an "airframe" or a "fuselage".

Such an aircraft also includes a power plant for driving a power transmission gearbox secured to the carrier structure of the aircraft. The gearbox then includes a mast for driving the lift rotor in rotation.

It should be observed that the gearbox is often connected to the carrier structure via a bottom wall and auxiliary fastener means generally comprising three or four sloping tie bars. Because of its shape, the person skilled in the art sometimes refers to the structure for mounting the lift rotor and including the gearbox and the tie bars as a "pylon".

The lift rotor and/or the gearbox may give rise to vibration that is uncomfortable for the occupants of the aircraft because of the vibratory motion and the noise that are generated in the aircraft by that vibration. Furthermore, equipment of the aircraft arranged in the carrier structure can be damaged by the vibration generated by the mechanical assembly comprising the gearbox and the lift rotor.

Under such circumstances, various suspension devices are known for suspending the gearbox in order at least to reduce vibration within the aircraft, and in particular within a cabin, for reasons of pilot and passenger comfort.

Such a suspension device must be capable firstly of transmitting the static load induced by the mechanical assembly, and secondly of filtering out the vibration induced by the mechanical assembly. It is observed that this vibration is produced at very low frequency and is then uncomfortable for the occupants of the aircraft.

Furthermore, it can be understood that a manufacturer seeks to obtain a suspension device that is of minimum impact in terms of weight and cost.

It should be observed that certain aircraft include a suspension rotor that may operate in flight at different speeds of rotation. It is then advantageous to have a suspension device that is adapted to that type of technology.

In the state of the art, document FR 2 363 737 discloses a vibration isolation device that connects a vibrating mass to a body.

The isolation device comprises a lever arm loaded by a weight, with pivot means connecting said vibrating weight to said arm. In addition, a torsion spring device is connected to the lever arm.

Document FR 2 474 996 discloses a suspension device for a mechanical assembly of a helicopter.

That suspension device presents three sloping tie bars and a suspension plate of a power transmission gearbox. The suspension plate has a central portion secured to a bottom of the gearbox and one arm per sloping tie bar. Each arm is hinged in the region of its proximal end firstly to the fuselage and secondly to an extreme zone of the corresponding tie bar. The distal end of each arm also carries a flyweight.

Document FR 2 499 505 discloses a suspension device having at least three tie bars fastened to a power transmission gearbox via their top ends.

Under such circumstances, the bottom ends of the tie bars are hinged to arms arranged radially around a base of the gearbox to which the arms are connected. Each arm is also hinged to a strong point of the aircraft fuselage and carries a weight mounted at the end of a support.

The base of the gearbox is also arranged on a suspension plate comprising a diaphragm that is deformable in bending.

According to document FR 2 747 098, a suspension device has flyweights and means for moving those flyweights in a longitudinal direction along a support.

Under such circumstances, the device includes at least one sensor capable of measuring the values of at least one parameter representative of a performance criterion of the device, and a computer receiving said values in order to servo-control the positions of the flyweights via the means for moving them.

That device thus makes it possible to combat vibration that occurs at varying frequency.

Document FR 2 795 386 discloses a suspension device having a plurality of sloping tie bars.

Each sloping tie bar is hinged to a carrier structure via a lever supporting a flyweight. Each lever is then connected to the carrier structure by a torsion spring.

Document FR 2 787 762 discloses a suspension device having a plurality of sloping tie bars.

Each sloping tie bar is hinged to a carrier structure by a lever supporting a flyweight. Each lever is connected to the carrier structure via a pivot connection, and to a power transmission gearbox via a torsion spring.

Reference may also be made to document WO 03/100284.

BRIEF SUMMARY OF THE INVENTION

An object of the present invention is thus to propose antivibration suspension means for a tie bar of a suspension device for a mechanical assembly of an aircraft having a power transmission gearbox and a lift rotor, the suspension means remaining effective for different flight conditions and configurations of the aircraft in order to minimize uncomfortable vibration, in particular as perceived by pilots and passengers.

According to the invention, antivibration suspension means for a tie bar connecting a power transmission gearbox of an aircraft to a carrier structure, the suspension means comprise a lever extending from a distal end supporting at least one flyweight to a proximal end provided with first hinge means for hinging the lever to a carrier structure carrying said mechanical assembly, the suspension means having a second hinge for hinging a tie bar to the lever.

These antivibration suspension means are remarkable in particular in that they include torsion return means fitted with a rotary actuator having an outlet shaft movable in rotation about a torsion axis, the outlet shaft being secured to the lever to generate torque on the lever proportional to the pivot angle of the torsion shaft, thereby imparting torsion stiffness to the first hinge, the suspension means including a computer controlling the actuator to adapt the torsion stiffness of the lever to the flight conditions of the aircraft.

Thus, the invention proposes in particular active suspension means for a tie bar of a suspension device, the active suspension means making use of torsion return means that are active, rather than a passive torsion spring.

Depending on flight conditions, the computer causes the outlet shaft of an actuator to turn so as to optimize filtering of the vibration induced by the mechanical assembly. By enabling the stiffness in torsion of the lever to be adjusted, a device is obtained that is capable of filtering vibration that occurs over a range of frequencies and not only at a single given frequency. For example, the frequency range covers a range extending from a predetermined nominal frequency minus ten percent to said predetermined nominal frequency plus ten percent.

The antiresonant nature of the suspension means can thus be adapted to flight conditions. For example, the computer may be connected for this purpose to devices for measuring at least one parameter representative of a performance criterion in order to servo-control the angular position of the outlet shaft relative to a nominal position.

Certain known devices present torsion stiffness that is constant. Setting that torsion stiffness thus leads to operation of the device being optimized for filtering vibration as produced at a given frequency, and thus for a limited number only of flight configurations.

In contrast, the actuator of the invention generates variable torque that is equivalent to variable torsion stiffness. By modifying the state of the actuator, it is possible to vary torsion stiffness on request, with modulation of the torque generated enabling the device to cover a wider range of frequencies so that the aircraft can present an optimized level of vibration over a wider set of flight configurations.

More precisely, the actuator creates rotary torque that is transmitted to the lever, the lever sometimes being referred to as a "flapping blade". Because of the angular movement of the lever, the torque gives rise to torsion stiffness that the computer adapts as a function of the flight configuration.

Such a computer may then comprise a processor and memory storing at least one control relationship, the processor executing the information stored in order to control the actuator as a function of said control relationships.

In a first variant, it should be observed that the actuator may be an electric actuator presenting the advantage of being compact and of minimizing maintenance time.

In a second variant, the actuator may be a hydraulic actuator. Such a hydraulic actuator makes it possible to generate high levels of torque, but it requires a hydraulic circuit to be provided that includes, for example, a hydraulic directional control valve, pumps, pipework, and tanks.

For safety reasons, such a hydraulic circuit may also include safety valves in order to block the actuator in a predetermined safe position in the event of the device malfunctioning.

Depending on the characteristics of the aircraft, a manufacturer may thus select the embodiment that is the most suitable for requirements.

The device may also include one or more of the following additional characteristics.

For example, the suspension means may include means for measuring the speed of rotation of the lift rotor, the computer being connected to the measurement means in order to adapt said torsion stiffness as a function of said speed of rotation.

The computer then controls an actuator while taking into consideration fluctuations in the speed of rotation of the lift rotor.

By way of example, such means for measuring the speed of rotation of the lift rotor may comprise sensors measuring the speed of rotation of the mast of the gearbox that is connected to the lift rotor.

The suspension means may also include a system for measuring vibration levels, in order to adapt said torsion stiffness as a function of the measured vibration levels. The vibration level measurement system may be provided with a set of accelerometers distributed within the aircraft.

The computer then controls an actuator by taking into consideration the vibration levels observed in the aircraft.

The computer may then apply a servo-control algorithm for the actuator that implements at least one control relationship in which the torque to be generated is a function of the angular position of the outlet shaft and also of an anticipation term, the anticipation term being a function of the speed of rotation of the lift rotor and/or of the measured vibration level, depending on the embodiment.

Furthermore, the first hinge may comprise a pivot connection having a first pivot shaft directed along a first direction, the first pivot shaft being inserted in a fitting suitable for being fastened to the carrier structure.

The lever may then pivot about this first pivot axis.

Under such circumstances, the first hinge includes a fitting suitable for fastening to a carrier structure co-operating with a first pivot axis, which fitting may include at least one stop for limiting the stroke of the lever.

Thus, in the event of the actuator malfunctioning, the pivoting of the lever is restricted by said at least one stop to remain within a sector that has been predetermined by the manufacturer.

Furthermore, it should be observed that the outlet shaft may optionally be directed along the first direction, and thus be in alignment on the first pivot axis.

According to another aspect, the second hinge may include a ball joint having a second connection shaft directed along a second direction.

The second direction may then be parallel to the outlet shaft.

In addition to providing suspension means for a tie bar of a gearbox, the invention also provides a device fitted with the suspension means.

Such an antivibration suspension device for a mechanical assembly having at least one lift rotor and a power transmission gearbox includes at least three tie bars, each hinged via a top end to the gearbox and via a bottom end to suspension means, at least one suspension means including a lever extending from a distal end supporting at least one flyweight to a proximal end having a first hinge to a carrier structure, the suspension means having a second hinge for hinging a tie bar via a second hinge to the lever between said proximal end and a center of gravity of the lever.

The suspension means are of the above-described type, the suspension means including torsion return means having a rotary actuator with an outlet shaft movable in rotation about a torsion axis, the outlet shaft being secured to the lever to generate torque on the lever proportional to its pivot angle, thereby inducing torsion stiffness at said first hinge, the suspension means including a computer controlling the actuator to adapt the torsion stiffness of the lever to flight conditions.

For example, the suspension device includes at least three tie bars, each tie bar including respective suspension means of the invention.

Under such circumstances, the computers of the suspension means may together be constituted by a single computer controlling all of the actuators.

Thus, the device may more particularly have at least three optionally sloping tie bars, each tie bar having respective suspension means with a rotary actuator controlled by a computer. Advantageously, a single computer controls all of the actuators of the device.

In addition to a suspension device, the invention also provides an aircraft having a carrier structure and a mechanical assembly including a lift rotor together with a power transmission gearbox driving the lift rotor.

The suspension device is then of the above-described type.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are present in more than one of the figures are given the same references in each of them.

DETAILED DESCRIPTION OF THE INVENTION

Figure 1:
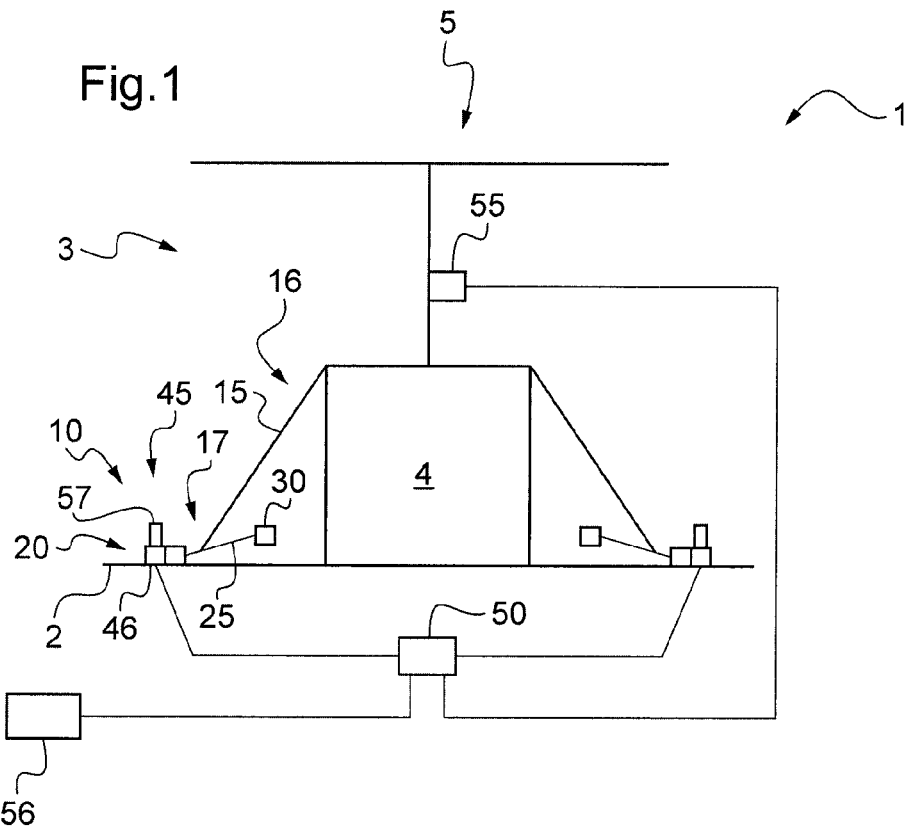
FIG. 1 is a diagrammatic view of an aircraft of the invention.

FIG. 1 shows an aircraft 1 having a carrier structure 2. The aircraft 1 also has a mechanical assembly 3 fastened to the carrier structure 2 in order to participate in particular in providing the aircraft 1 with lift.

The mechanical assembly 3 includes a lift rotor 5, with a power transmission gearbox 4 of the mechanical assembly 3 being interposed between the lift rotor 5 and a power plant that is not shown in the figures.

The representation of the aircraft in the figures is deliberately incomplete in order to avoid overloading the figures.

The aircraft 1 includes a suspension device for reducing the vibration and noise generated by the mechanical assembly 3.

The suspension device includes at least one tie bar 15, or indeed at least three tie bars 15. Each tie bar extends from a top end 16 to a bottom end 17. Under such circumstances, each top end 16 is hinged to the gearbox 4 and in particular to a top portion of the gearbox 4, while each bottom end 17 is hinged to suspension means 20 interfacing with the tie bar 15 and the carrier structure 2.

Each suspension means 20 may include a lever 25 carrying a flyweight 30 and also the bottom end 17 of a tie bar. In addition, the suspension means may include torsion return means 45 comprising an actuator 46 co-operating with the lever 25 and a computer 50.

A single computer 50 may control all of the actuators of the suspension device 10.

Furthermore, the computer 50 may be connected to devices for measuring at least one parameter representative of a performance criterion.

Such measurement devices may comprise:

measurement means 55 for measuring the speed of rotation of a lift rotor 5 of the aircraft;

a measurement system 56 for measuring vibration levels of the aircraft, e.g. provided with a set of accelerometers placed in a cabin or a cockpit of the aircraft; and/or determination means 57 for determining the state of each actuator, e.g. means for determining the pivot angle of the output shaft of the actuator relative to a nominal position.

It should be observed that the suspension device may also include a complementary suspension system arranged between the bottom of the gearbox 4 and the carrier structure, for example.

Figure 2:
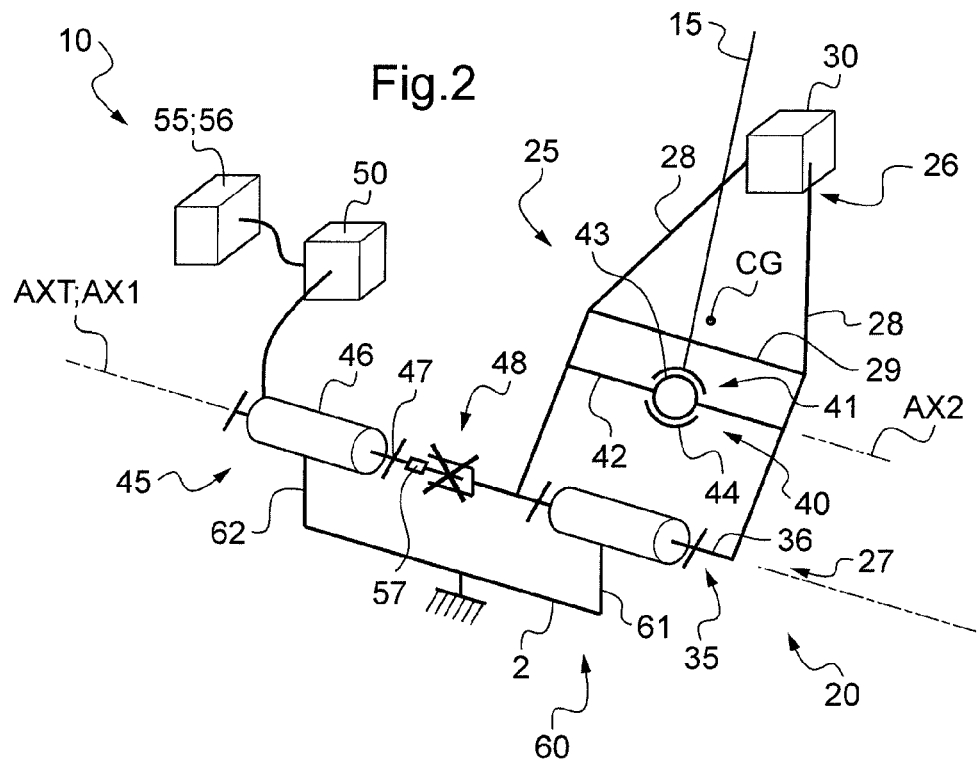
FIG. 2 is a diagrammatic view of suspension means.

FIG. 2 shows details of suspension means 20 of the invention.

The suspension means 20 comprise a lever 25. The lever 25 may comprise two longitudinal arms 28 connected together by a transverse arm 29 so as to be H-shaped. The lever 25 then extends longitudinally from a "proximal" end 27 to a "distal" end 26.

The lever 25 then carries at least one flyweight 30, this flyweight being arranged at the distal end 26 of the lever 25.

In addition, the proximal end 27 is provided with a first hinge 35 enabling the lever 25 to be connected to the carrier structure 2.

This first hinge 35 optionally includes a pivot connection enabling the lever to turn, and thus enabling the flyweight 30 to rock about a first direction AX1.

The first hinge may then include a fitting 60 suitable for fastening to the carrier structure 2. A first pivot shaft 36 of the first hinge may then pass through at least one cheekplate 61 of the fitting 60.

In addition, the suspension means includes a second hinge 40 for hinging a tie bar 15 to the lever 25 close to the first hinge. For example, the second hinge 40 is arranged in a zone lying between the proximal end 27 and the center of gravity Cg of the assembly comprising the lever and the flyweight.

This second hinge may include at least one pivot connection. The second hinge may advantageously be a ball joint provided with a second connection shaft 42 passing through a spherical internal portion 43 of a ball joint, this spherical internal ball being arranged in a cage 44 of the bottom portion 17 of a tie bar 15.

The second connection shaft 42 extends along a second direction AX2 parallel to the first direction AX1.

The suspension means 20 also include torsion return means 45.

The return means comprise a rotary actuator 46 having a cylinder and an outlet shaft 47. The cylinder may be fastened to a cheekplate 62 of the fitting 60.

Furthermore, the outlet shaft 47 is secured to the lever 25 via a full connection 48, for example.

The actuator is then controlled by a computer 50.

The computer 50 may require the outlet shaft 47 to turn about a torsion axis AXT in order to move away from a nominal position, for example. Determination means 57 for determining the state of the actuator can supply the computer with the angular position α of the outlet shaft relative to said nominal position, where appropriate.

It should be observed that the outlet shaft 47 is directed along the first direction AX1.

Figure 3:
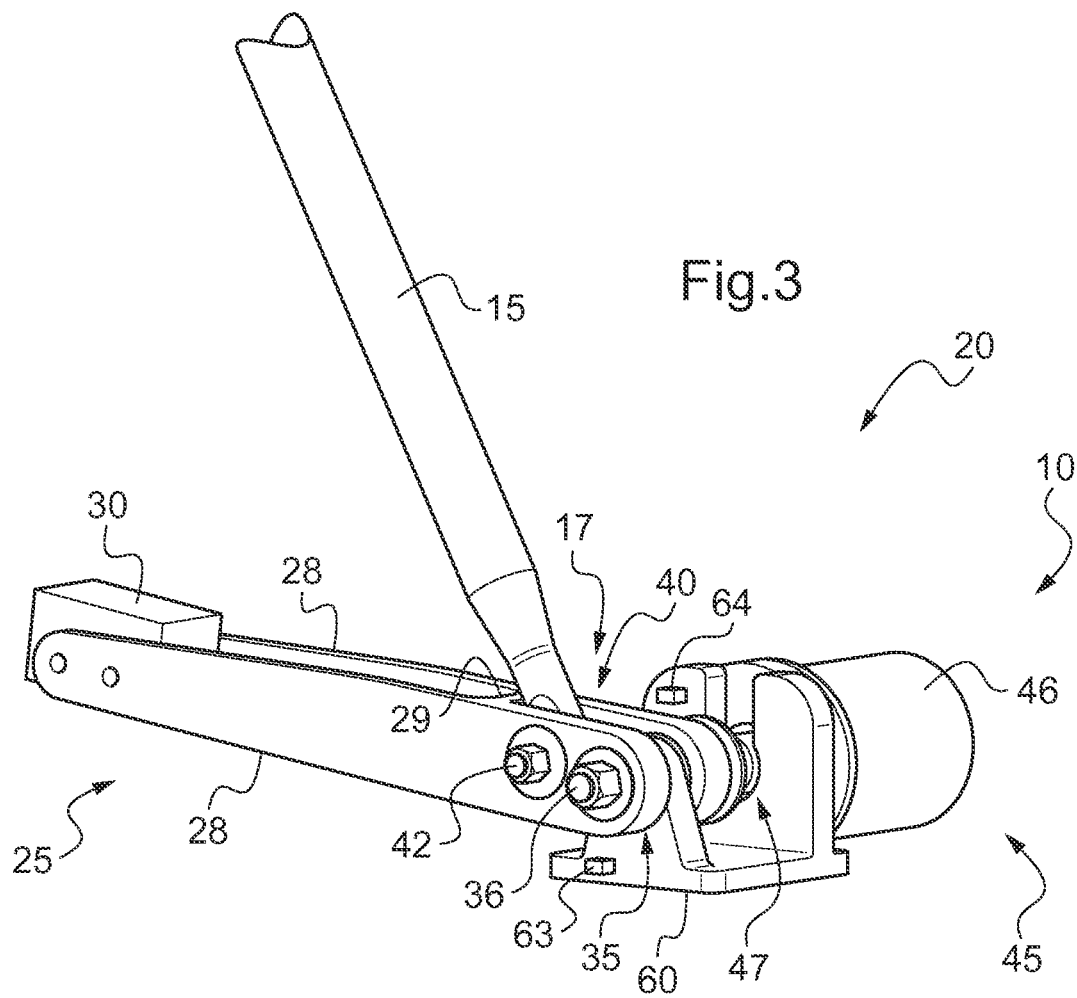
FIG. 3 is a three-dimensional view of an embodiment of suspension means.

FIG. 3 is a three-dimensional view of the suspension means 20.

FIG. 3 shows, in particular, stops 63 and 64 suitable for limiting the angular stroke of the lever 25 in order to increase the safety of the suspension means.

The resulting suspension means are then relatively simple, while presenting limited overall size and weight.

Figure 4:
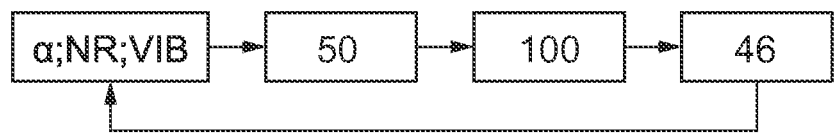
FIG. 4 is a diagram explaining the operation of the invention.

FIG. 4 explains the operation of the suspension means for reducing the vibration created or emitted by a mechanical assembly 3.

As a function of information relating to predetermined parameters, the computer 50 orders turning of the outlet shaft 47 of the actuator 46.

The outlet shaft 47 then generates torque on the lever 25 that is proportional to the angle through which the outlet shaft has pivoted about the torsion axis. This torque is equivalent to stiffness in torsion of the suspension means at the first hinge of the carrier structure.

Under such circumstances, the computer adjusts the torsion stiffness of the suspension means via the outlet shaft, so that the suspension means filter the vibration emitted at a certain frequency.

Depending on flight conditions, the mechanical assembly may emit vibration at a new frequency that is different from said certain frequency.

On the basis of the parameters that reach it, the computer detects this change in flight conditions. The computer 50 then causes the actuator 46 to adapt the torsion stiffness of the suspension means so that the suspension means filter the vibration produced at the new frequency.

The relationship determining the influence of torsion stiffness on the anti-resonant behavior of the suspension means is linear. Consequently, the computer may include at least one control relationship that is simple for use in determining the order that is to be transmitted to the actuator.

For this purpose, the parameters transmitted to the computer and used by the computer on the basis of the control relationship may include the angular position α of the outlet shaft, at least one vibration level VIB, e.g. measured in the cabin, or indeed the speed of rotation NR of the lift rotor.

The actuator may be an electric actuator.

The computer can then control the electric actuator directly using known methods.

In another variant, the actuator is a rotary hydraulic actuator.

The computer then communicates with a hydraulic circuit 100 in communication with the actuator 46.

The hydraulic circuit may be a circuit dedicated to this application, or it may be part of a hydraulic circuit that already exists in the aircraft.

Furthermore, the hydraulic circuit may include safety valves for use in the event of an element in the hydraulic circuit failing. Such safety valves may enable the actuator to be positioned in a predetermined safe position.

Independently of the variant, it can be understood that the actuator presents a reaction time that is suitable to enable the suspension means to adapt to changes in flight configuration.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. Antivibration suspension means for a tie bar connecting a power transmission gearbox of an aircraft to a carrier structure, the suspension means comprising a lever extending from a distal end supporting at least one flyweight to a proximal end provided with first hinge means for hinging the lever to a carrier structure, the suspension means having a second hinge for hinging the tie bar to the lever, and including torsion return means fitted with a rotary actuator having an outlet shaft movable in rotation about a torsion axis (AXT), said outlet shaft being secured to said lever to generate torque on the lever proportional to its pivot angle, thereby imparting torsion stiffness to said first hinge, said suspension means including a computer controlling said actuator to adapt said torsion stiffness of the lever to the flight conditions of said aircraft.

2. Suspension means according to claim 1, wherein said suspension means include means for measuring a speed of rotation of a lift rotor of said aircraft, said computer being connected to the measurement means in order to adapt said torsion stiffness as a function of said speed of rotation.

3. Suspension means according to claim 1, wherein said suspension means include a measurement system for measuring vibration levels of said aircraft in order to adapt said torsion stiffness as a function of the measured vibration levels.

4. Suspension means according to claim 1, wherein said first hinge comprises a pivot connection having a first pivot shaft directed along a first direction (AX1), said first pivot shaft being inserted in a fitting suitable for being fastened to a carrier structure carrying said gearbox.

5. Suspension means according to claim 4, wherein said outlet shaft is directed along said first direction (AX1).

6. Suspension means according to claim 4, wherein said first hinge includes said fitting co-operating with said first pivot axis (AX1), and said fitting includes at least one stop for limiting the stroke of the lever.

7. Suspension means according to claim 1, wherein said second hinge includes a ball joint having a second connection shaft directed along a second direction (AX2).

8. Suspension means according to claim 7, wherein said second direction (AX2) is parallel to said outlet shaft.

9. An antivibration suspension device for a mechanical assembly having at least one lift rotor and a power transmission gearbox, the suspension device including at least three tie bars, each of the three tie bars being hinged via a top end to the gearbox and via a bottom end to suspension means, at least one suspension means including a lever extending from a distal end supporting at least one flyweight to a proximal end having a first hinge for hinging the lever to a carrier structure, the at least one suspension means having a second hinge for hinging a tie bar to the lever between said proximal end and a center of gravity (Cg) of the lever, the at least one suspension means including torsion return means having a rotary actuator with an outlet shaft movable in rotation about a torsion axis (AXT), said outlet shaft being secured to said lever to generate torque on said lever proportional to its pivot angle, thereby inducing torsion stiffness at said first hinge, said at least one suspension means including a computer controlling said actuator to adapt said torsion stiffness of the lever to flight conditions.

10. A suspension device according to claim 9, wherein the computers of the suspension means are constituted together by a single computer controlling all of the actuators.

11. An aircraft having a carrier structure and a mechanical assembly including a lift rotor and a power transmission gearbox driving the lift rotor, wherein the aircraft includes a suspension device according to claim 9.

12. Antivibration suspensi0on device for a tie bar connecting a power transmission gearbox of an aircraft to a carrier structure, the suspension device comprising a lever extending from a distal end supporting at least one flyweight to a proximal end provided with a first hinge for hinging the lever to a carrier structure, the suspension device having a second hinge for hinging the tie bar to the lever, and including a torsion return fitted with a rotary actuator having an outlet shaft movable in rotation about a torsion axis (AXT), the outlet shaft being secured to the lever to generate torque on the lever proportional to its pivot angle, thereby imparting torsion stiffness to the first hinge, the suspension device including a computer controlling the actuator to adapt the torsion stiffness of the lever to the flight conditions of the aircraft.

13. Suspension device according to claim 12, wherein the suspension device includes a measurement device sensor for measuring a speed of rotation of a lift rotor of the aircraft, the computer being connected to the measurement device on order to adapt the torsion stiffness as a function of the speed of rotation.

14. Suspension device according to claim 12, wherein the suspension device includes a measurement system for measuring vibration levels of the aircraft on order to adapt the torsion stiffness as a function of the measured vibration levels.

15. Suspension device according to claim 12, wherein the first hinge comprises a pivot connection having a first pivot shaft directed along a first direction (AX1), the first pivot shaft being inserted in a fitting suitable for being fastened to a carrier structure carrying the gearbox.

16. Suspension device according to claim 15, wherein the outlet shaft is directed along the first direction (AX1).

17. Suspension device according to claim 15, wherein the first hinge includes the fitting co-operating with the first pivot axis (AX1), and the fitting includes at least one stop for limiting the stroke of the lever.

18. Suspension device according to claim 12, wherein the second hinge includes a ball joint having a second connection shaft directed along a second direction (AX2).

19. Suspension device according to claim 18, wherein the second direction (AX2) is parallel to the outlet shaft.

* * * * *